US010044592B2

(12) United States Patent
Su et al.

(10) Patent No.: US 10,044,592 B2
(45) Date of Patent: Aug. 7, 2018

(54) METHOD AND APPARATUS FOR DEVICE TO DEVICE COMMUNICATION IN A WIRELESS COMMUNICATION SYSTEM AND RELATED APPARATUS USING THE SAME

(71) Applicant: ASUSTeK COMPUTER INC., Taipei (TW)

(72) Inventors: Hsuan-Jung Su, Taipei (TW); Ping-Tsung Tu, Taipei (TW); Alan Shenghan Tsai, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 328 days.

(21) Appl. No.: 14/931,850

(22) Filed: Nov. 4, 2015

(65) Prior Publication Data

US 2016/0128064 A1  May 5, 2016

Related U.S. Application Data

(60) Provisional application No. 62/074,663, filed on Nov. 4, 2014, provisional application No. 62/074,664, filed
(Continued)

(51) Int. Cl.
*H04L 12/26* (2006.01)
*H04W 4/00* (2018.01)
(Continued)

(52) U.S. Cl.
CPC ............. *H04L 43/16* (2013.01); *H04W 4/005* (2013.01); *H04W 4/70* (2018.02); *H04W 52/146* (2013.01);
(Continued)

(58) Field of Classification Search
CPC .. H04L 43/16; H04W 52/383; H04W 52/146; H04W 52/267; H04W 4/005;
(Continued)

(56) References Cited

U.S. PATENT DOCUMENTS

2014/0307642 A1* 10/2014 Wanstedt ............ H04W 76/023
370/329
2014/0376458 A1* 12/2014 Ryu ..................... H04W 72/085
370/329
(Continued)

FOREIGN PATENT DOCUMENTS

WO  2013123735   8/2013
WO  2013163859   11/2013
(Continued)

OTHER PUBLICATIONS

"Office Action of Japan Counterpart Application" with partial English translation thereof, dated Oct. 18, 2016, p. 1-p. 5.
(Continued)

*Primary Examiner* — Min Jung
(74) *Attorney, Agent, or Firm* — JCIPRNET

(57) ABSTRACT

The disclosure is directed to a method and apparatus for D2D communication in a wireless communication system and related apparatuses using the same. In one of the exemplary embodiments, a proposed method may include determining whether to performing a D2D transmission and a cellular transmission simultaneously in a resource block allocated in a cellular uplink time slot; if a cellular uplink transmission rate in addition to a D2D transmission rate is greater than or equal to a maximum cellular UL transmission rate: performing the D2D transmission and the cellular transmission simultaneously; and adjusting a power of the D2D transmission and a power of the cellular transmission to maximize an overall transmission rate which is the
(Continued)

cellular UL transmission rate in addition to the D2D transmission rate.

34 Claims, 9 Drawing Sheets

Related U.S. Application Data on Nov. 4, 2014, provisional application No. 62/075,165, filed on Nov. 4, 2014, provisional application No. 62/245,302, filed on Oct. 23, 2015.

(51) Int. Cl.

| | | |
|---|---|---|
| *H04W 4/70* | (2018.01) | |
| *H04W 52/14* | (2009.01) | |
| *H04W 52/26* | (2009.01) | |
| *H04W 52/38* | (2009.01) | |
| *H04W 52/24* | (2009.01) | |
| *H04W 52/36* | (2009.01) | |
| *H04W 72/04* | (2009.01) | |

(52) U.S. Cl.
CPC ....... *H04W 52/267* (2013.01); *H04W 52/383* (2013.01); *H04W 52/243* (2013.01); *H04W 52/367* (2013.01); *H04W 72/0486* (2013.01)

(58) Field of Classification Search
CPC ........... H04W 72/0486; H04W 52/367; H04W 52/243; H04W 88/06; H04W 76/023
See application file for complete search history.

(56) References Cited

U.S. PATENT DOCUMENTS

| | | | |
|---|---|---|---|
| 2015/0009970 A1 | 1/2015 | Yu et al. | |
| 2015/0049736 A1 | 2/2015 | Liu et al. | |
| 2015/0056982 A1* | 2/2015 | Sorrentino | H04W 60/00 455/426.1 |
| 2015/0126236 A1* | 5/2015 | Mukherjee | H04B 7/0417 455/522 |
| 2016/0044653 A1* | 2/2016 | Bagheri | H04W 72/0413 370/329 |
| 2016/0262155 A1* | 9/2016 | Lindoff | H04W 72/0453 |
| 2016/0337877 A1* | 11/2016 | Sorrentino | H04W 72/04 |
| 2017/0118621 A1* | 4/2017 | Sorrentino | H04W 8/005 |

FOREIGN PATENT DOCUMENTS

| | | |
|---|---|---|
| WO | 2013182422 | 12/2013 |
| WO | 2014101179 | 7/2014 |

OTHER PUBLICATIONS

Xu et al., "Effective Interference Cancellation Scheme for Device-to-Device Communication Underlaying Cellular Networks," IEEE 72nd Vehicular Technology Conference Fall (VTC 2010-Fall), Sep. 6-9, 2010, pp. 1-5.

"Office Action of Europe Counterpart Application", dated Aug. 1, 2016, p. 1-p. 11.

* cited by examiner

METHOD AND APPARATUS FOR DEVICE TO DEVICE COMMUNICATION IN A WIRELESS COMMUNICATION SYSTEM AND RELATED APPARATUS USING THE SAME

CROSS REFERENCE TO RELATED APPLICATION

This application claims the priority benefits of U.S. provisional application Ser. No. 62/074,663, filed on Nov. 4, 2014, U.S. provisional application Ser. No. 62/074,664, filed on Nov. 4, 2014, U.S. provisional application Ser. No. 62/075,165, filed on Nov. 4, 2014, and U.S. provisional application Ser. No. 62/245,302, filed on Oct. 23, 2015. The entirety of each of the above-mentioned patent applications is hereby incorporated by reference herein and made a part of specification.

TECHNICAL FIELD

The present disclosure is directed to a method and apparatus for device-to-device (D2D) communication in a wireless communication system and a related apparatus using the same.

BACKGROUND

Conventionally, Device-to-device (D2D) communication has been a technique for improving spectral utilization, satisfying increasing demand for local traffic load and providing better user experiences. D2D communication could be defined as two peer devices in direct communication with each other without relying on a cellular network to relay user data in between. D2D communication may operate on a stand-alone spectrum which could be categorized as outband D2D. D2D communication may also coexist with cellular networks within a cellular spectrum which is categorized as inband D2D.

A motivation for choosing inband D2D is better control of the radio resources of a licensed cellular spectrum. Inband D2D may further be categorized into underlay and overlay operations. In the underlay scenario, D2D links share the same radio resources with the cellular links. In the overlay scenario, dedicated radio resources not occupied by the cellular links are allocated to the D2D links. An advantage of the inband overlay D2D operation is that there would normally be no interferences between D2D and cellular links. However, the overlay D2D operation would rely on centralized allocation, such as allocations by a base station, of a radio resource block (RB) to either D2D or cellular users. Challenges related to D2D communications in cellular networks as well as cellular network assisted D2D communications were abound and were discussed.

Overlay D2D communications would allow D2D and cellular users to use separate RBs and thus is not as efficient as the underlay D2D communications in terms of spectrum utilization. For better spectrum utilization, underlay D2D communications would usually be preferred, and thus the potential of underlay D2D communications for improving spectral efficiencies of cellular networks by offloading traffic from the cellular network to the D2D links has been investigated. However, underlay D2D communications may cause interferences to the cellular network which could severely degrade the performance of the cellular users. Thus, interference management and efficient resource reuse schemes could be critical issues. Subsequently, a practical and efficient scheme has been proposed for generating local awareness of interferences between the cellular and D2D terminals at a base station (BS), which then exploits the multiuser diversity inherent in the cellular network to minimize the interferences. Also, throughput could be maximized for a network with a single D2D pair and a single cellular user while the quality-of-service (QoS) of the cellular user was considered.

For effective interference management, the central unit such as a BS that allocates the radio resources would usually need to know the locations of users as well as the channels between D2D and cellular users. Information related to channels between D2D users in general could be quite difficult to obtain. In addition, optimizations of the network in the presence of mutual interferences would typically be computationally intensive. Thus, in contrast to overlay D2D, effective operations of underlay D2D communications would incur more system overhead and would be more difficult. Operations involving overlay D2D in which D2D and cellular users use orthogonal RBs and underlay D2D in which D2D and cellular users use non-orthogonal RBs were considered.

To facilitate inband D2D in cellular networks with less interference between D2D and cellular users, many existing works assumed that D2D communication operates in the cellular uplink (UL) band. This has also been adopted as the basic assumption in the 3GPP D2D design.

SUMMARY OF THE DISCLOSURE

The present disclosure is directed to a method and apparatus of device-to-device (D2D) communication in a wireless communication system and a related apparatus using the same.

In one of the exemplary embodiments, the disclosure is directed to a method and apparatus for device to device (D2D) communication in a wireless communication system applicable to a user equipment (UE). The method would include but not limited to: determining whether to perform a D2D transmission and a cellular transmission simultaneously in a resource block allocated in a cellular uplink time slot; if a cellular uplink (UL) transmission rate ($R_{UL}$) in addition to a D2D transmission rate ($R_{D2D}$) is greater or equal to a maximum cellular UL transmission rate ($R_C$): performing the D2D transmission and the cellular transmission simultaneously; and adjusting a power of the D2D transmission ($P_{D2D}$) and a power of the cellular transmission ($P_{UL}$) to maximize an overall transmission rate which is the cellular UL transmission rate in addition to the D2D transmission rate; and if the cellular UL transmission rate ($R_{UL}$) in addition to the D2D transmission rate ($R_{D2D}$) is less than the maximum cellular UL transmission rate ($R_C$), performing the D2D transmission and the cellular transmission in different resource blocks.

In one of the exemplary embodiments, the disclosure is directed to a method and apparatus for device to device (D2D) communication in a wireless communication system applicable to a base station (BS) for scheduling UEs in a selection pool. The method would include not limited to: receiving, from each UE of the selection pool, a maximum rate of transmission and a transmission mode corresponding to each UE in the selection pool; and scheduling each UE in the selection pool based on a maximum rate scheduling or a proportional fair scheduling, wherein scheduling each UE would include: determining whether a first UE is scheduled with a cellular uplink (UL) transmission and a D2D transmission simultaneously; determining whether the D2D transmission of the first UE is with a second UE and whether the D2D transmission is in the same time interval as the cellular UL transmission; if the first UE is scheduled with a cellular uplink (UL) transmission and a D2D transmission simultaneously and the D2D transmission of the first UE is with the second UE, then adjusting a schedule of the second UE so that the second UE receives the D2D transmission from the first UE, the second UE does not receive the D2D transmission from the first UE with a cellular UL transmission in a same time interval.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
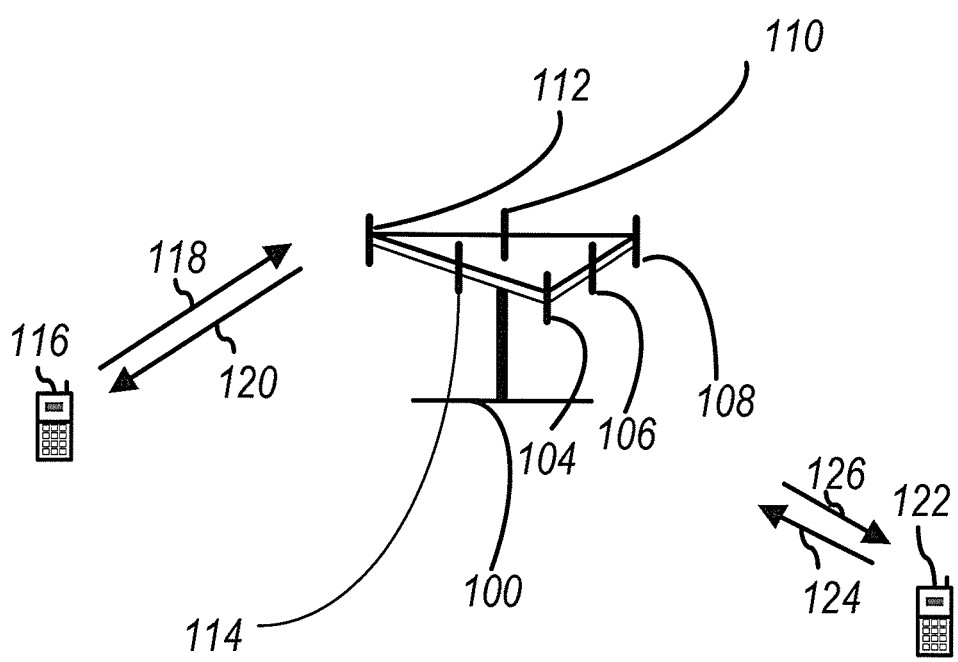
FIG. 1 illustrates a multiple access wireless communication system according to one of the exemplary embodiments of the disclosure.

Reference will now be made in detail to the present exemplary embodiments of the disclosure, examples of which are illustrated in the accompanying drawings. Wherever possible, the same reference numbers are used in the drawings and the description to refer to the same or like parts.

FIG. 1~FIG. 6 and their corresponding written descriptions disclose overall concepts of the disclosure. FIG. 7~FIG. 13 and their corresponding written descriptions disclose various exemplary embodiments with further details.

In this disclosure, 3GPP-like keywords or phrases were used merely as examples to present inventive concepts in accordance with the present disclosure; however, the same concept presented in the disclosure could be extended to other communication systems such as IEEE 802.11, IEEE 802.16, WiMAX, and so like by persons of ordinarily skilled in the art.

The exemplary wireless communication systems and devices described below employ a wireless communication system, supporting a broadcast service. Wireless communication systems are widely deployed to provide various types of communication such as voice, data, and so on. These systems could be based on code division multiple access (CDMA), time division multiple access (TDMA), orthogonal frequency division multiple access (OFDMA), 3GPP Long Term Evolution (LTE) wireless access, 3GPP LTE-A (Long Term Evolution Advanced) wireless access, 3GPP2 UMB (Ultra Mobile Broadband), WiMax, or some other modulation techniques.

FIG. 1 illustrates a multiple access wireless communication system according to one of the exemplary embodiments of the disclosure. An access network 100 (AN) may include multiple antenna groups. One antenna group may include 104 and 106, another one antenna group may include 108 and 110, and an additional antenna group may include 112 and 114. In FIG. 1, only two antennas are shown for each antenna group, however, but more or fewer antennas could be utilized for each antenna group. The access terminal 116 (AT) is in communication with antennas 112 and 114, where antennas 112 and 114 transmit information to access terminal 116 over forward link 120 and receive information from access terminal 116 over reverse link 118. Access terminal (AT) 122 could be in communications with antennas 106 and 108 which would transmit information to AT 122 over a forward link 126 and receive information from AT 122 over a reverse link 124. In a FDD system, communication links 118, 120, 124 and 126 may use different frequencies for communications. For example, a forward link 120 may use a different frequency from a frequency that is used by a reverse link 118.

In general, each group of antennas and/or the area in which they are designed to communicate would often be referred to as a sector of the access network. For example, each of the antenna groups could be designed to communicate with access terminals in a sector of the areas covered by an access network, such as the access network 100.

To communicate over forward links 120 and 126, the transmitting antennas of access network 100 may utilize beamforming in order to improve the signal-to-noise ratio of forward links for the different access terminals 116 and 122. Also, an access network that uses beamforming to transmit to access terminals scattered randomly through its coverage would normally cause less interferences to access terminals in neighboring cells than an access network that transmits through a single antenna to all its access terminals.

An access network (AN) could be a fixed station or base station that communicates with terminals and may also be referred to as an access point, a Node B, a base station, an enhanced base station, an eNodeB, or some other terminology. An access terminal (AT) may also be called a user equipment (UE), a wireless communication device, terminal, access terminal or some other terminology.

Figure 2:
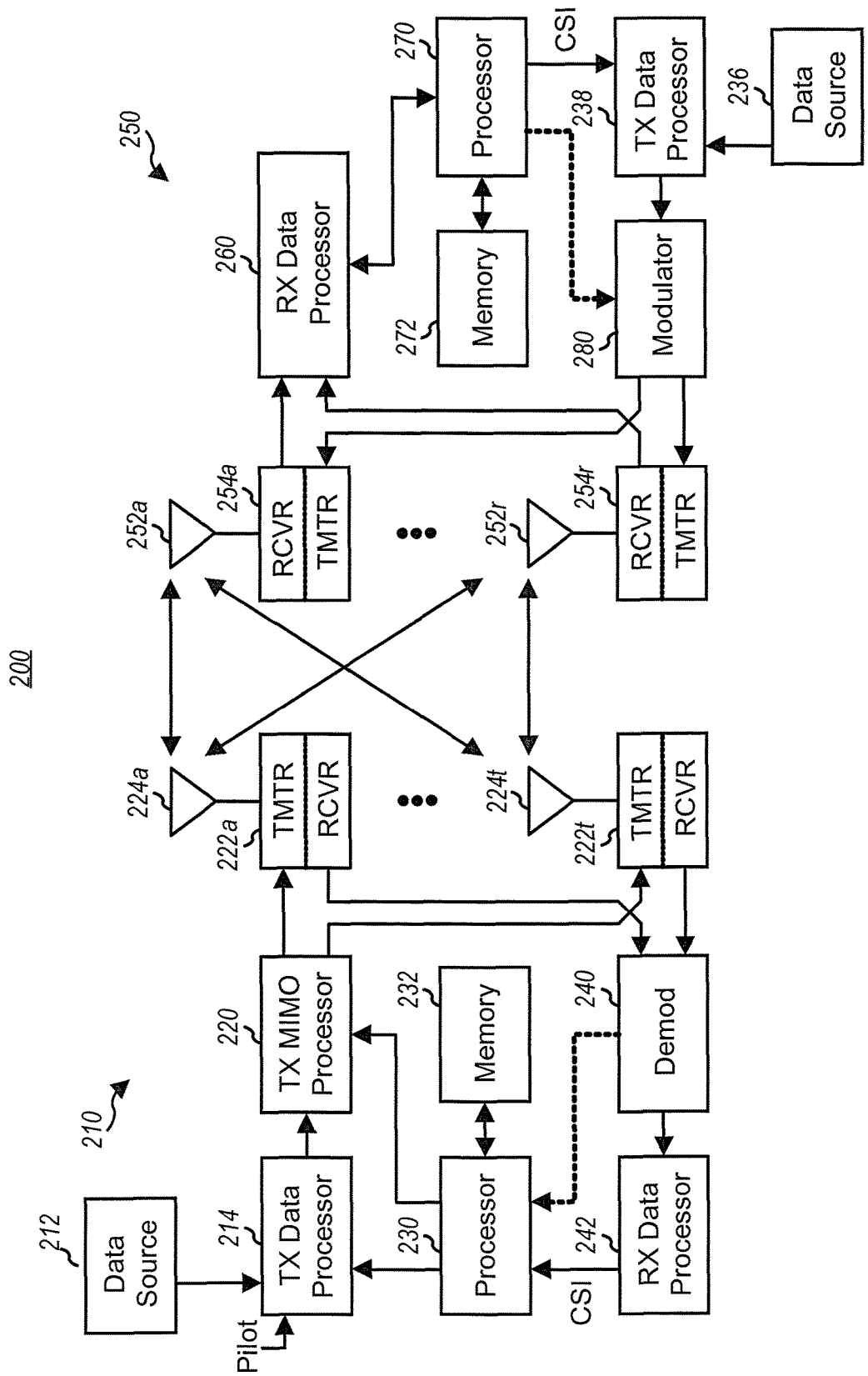
FIG. 2 is a simplified block diagram which illustrates an exemplary embodiment of a transmitter system and a receiver system.

FIG. 2 is a simplified block diagram which illustrates an exemplary embodiment of a transmitter system 210, which could also be known as an access network, and a receiver system 250, which could also be known as an access terminal (AT) or a user equipment (UE), in a MIMO system 200. At the transmitter system 210, traffic data for a number of data streams is provided from a data source 212 to a transmit (TX) data processor 214.

In an exemplary embodiment, each data stream could be transmitted over a respective transmit antenna. TX data processor 214 could format, code, and interleave the traffic data for each data stream based on a particular coding scheme selected for that data stream to provide coded data.

The coded data for each data stream could be multiplexed with pilot data using OFDM techniques. The pilot data would typically be a known data pattern that is processed in a known manner and may be used at the receiver system to estimate a channel response. The multiplexed pilot and coded data for each data stream would then be modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams would then be transmitted to a TX MIMO processor 220, which may further process the modulation symbols (e.g., for OFDM). The TX MIMO processor 220 would then provide NT modulation symbol streams to NT transmitters (TMTR) 222a through 222t. According to an exemplary embodiment, the TX MIMO processor may 220 apply beamforming weights to the symbols of the data streams and to the antenna from which the symbol is being transmitted.

Each transmitter 222 may receive and process a respective symbol stream to provide one or more analog signals, and further conditions may amplify, filter, or up-convert the analog signals to provide a modulated signal suitable for transmission over a MIMO channel. NT modulated signals from transmitters 222a through 222t would then be transmitted from NT antennas 224a through 224t, respectively.

At the receiver system 250, the transmitted modulated signals would be received by NR antennas 252a through 252r, and the received signal from each antenna 252 would be provided to a respective receiver (RCVR) 254a through 254r. Each receiver 254 conditions may filter, amplify, and down-convert a respective received signal, digitize the conditioned signal to provide samples, and further process the samples to provide a corresponding "received" symbol stream.

An RX data processor 260 would then receive and process the NR received symbol streams from NR receivers 254 based on a particular receiver processing technique to provide NT "detected" symbol streams. The RX data processor 260 would then demodulate, de-interleave, and decode each detected symbol stream to recover the traffic data for the data stream. The processing by the RX data processor 260 is complementary to that performed by the TX MIMO processor 220 and the TX data processor 214 at transmitter system 210.

The processor 270 may periodically determine which pre-coding matrix to use as discussed below. The processor 270 may formulate a reverse link message which includes a matrix index portion and a rank value portion.

The reverse link message may include various types of information regarding the communication link and/or the received data stream. The reverse link message would then be processed by a TX data processor 238, which also receives traffic data for a number of data streams from a data source 236, modulated by a modulator 280, conditioned by transmitters 254a through 254r, and transmitted back to transmitter system 210.

At the transmitter system 210, the modulated signals from receiver system 250 would also be received by antennas 224, conditioned by receivers 222, demodulated by a demodulator 240, and processed by a RX data processor 242 to extract the reserve link message transmitted by the receiver system 250. Processor 230 would then determine which pre-coding matrix to use for determining the beamforming weights then processes the extracted message.

The Memory 232 or storage medium may be used to temporarily store some buffered/computational data from 240 or 242 through Processor 230, store some buffed data from 212, or store some specific program codes. The Memory 272 or storage medium may be used to temporarily store some buffered/computational data from 260 through Processor 270, store some buffed data from 236, or store some specific program codes.

Figure 3:
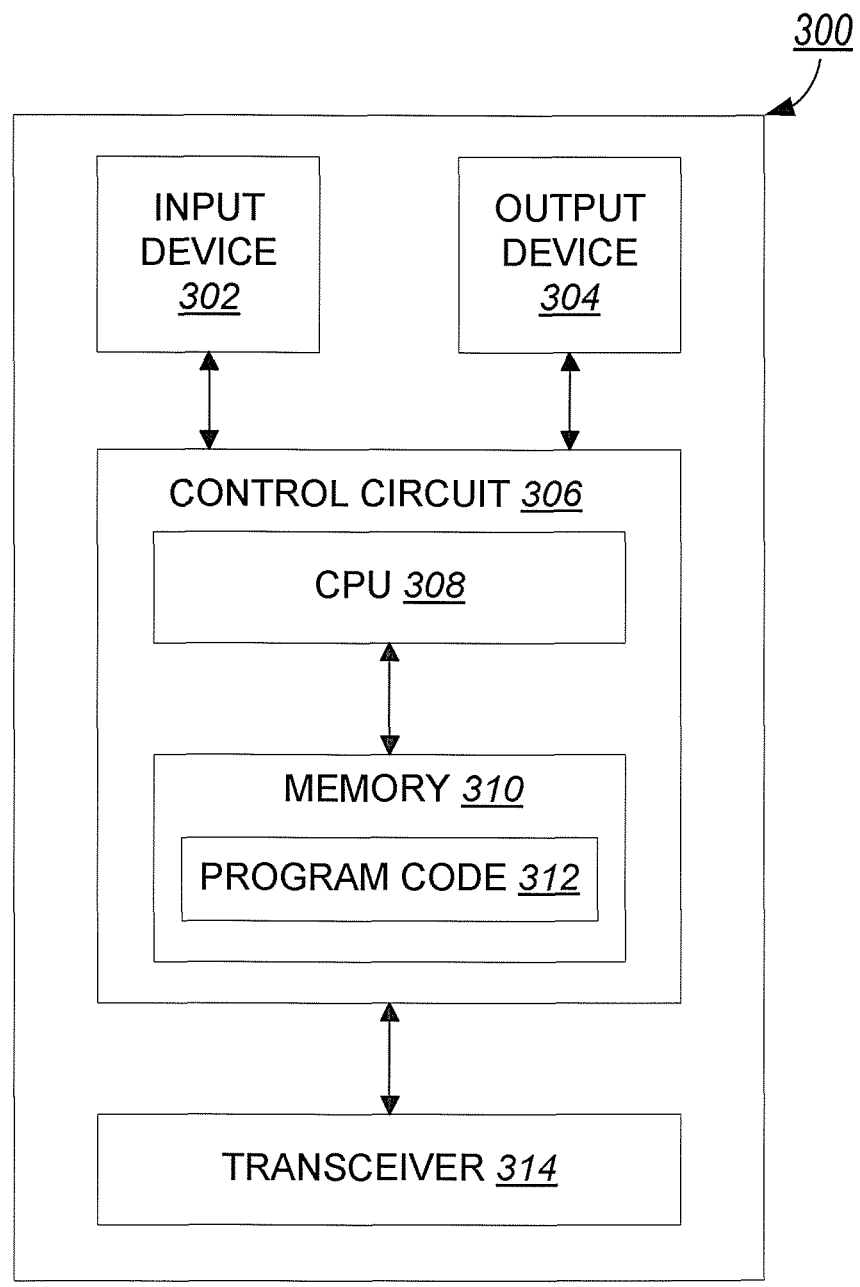
FIG. 3 illustrates an alternative simplified functional block diagram of a communication device in accordance with one of the exemplary embodiments of the disclosure.

FIG. 3 illustrates an alternative simplified functional block diagram of a communication device in accordance with one of the exemplary embodiments of the disclosure. As shown in FIG. 3, the communication device 300 in a wireless communication system could be utilized for realizing the UEs (or ATs) 116 and 122 of FIG. 1, and the wireless communications system could be the LTE system. The communication device 300 may include an input device 302, an output device 304, a control circuit 306, a central processing unit (CPU) 308, a memory 310, a program code 312, and a transceiver 314. The control circuit 306 would execute the program code 312 in the memory 310 through the CPU 308, thereby controlling an operation of the communications device 300. The communications device 300 may receive signals input by a user through the input device 302, such as a keyboard or keypad, and may output images and sounds through the output device 304, such as a monitor or speakers. The transceiver 314 would be used to receive and transmit wireless signals, delivering received signals to the control circuit 306, and outputting signals generated by the control circuit 306 wirelessly.

Figure 4:
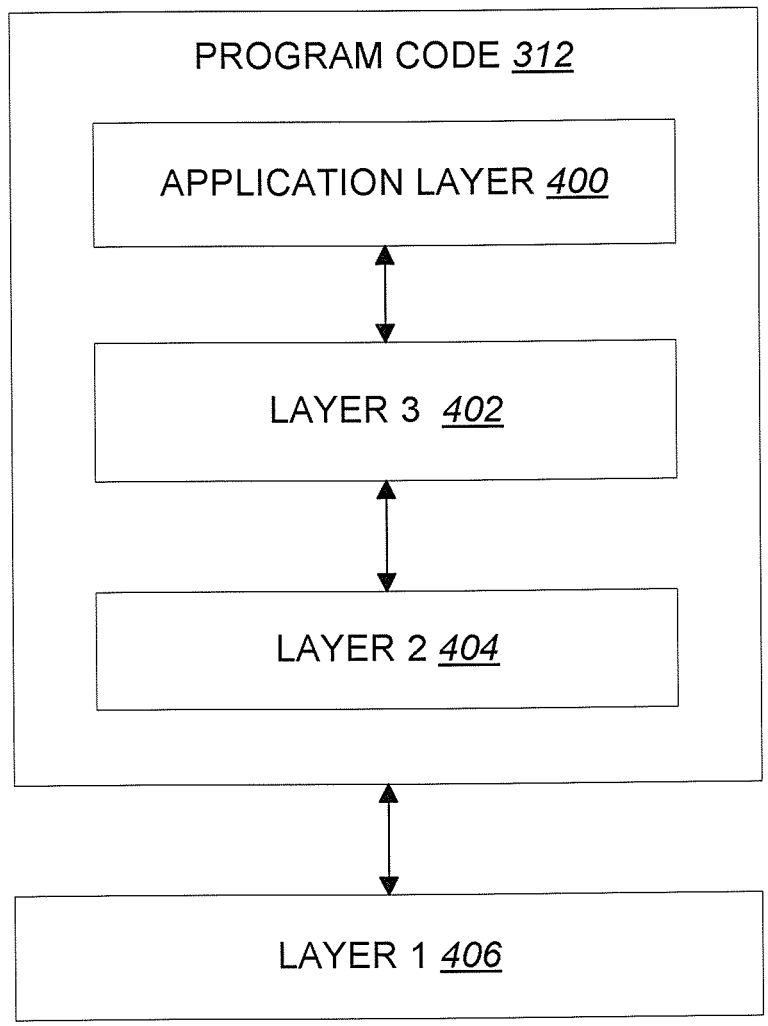
FIG. 4 illustrates a simplified block diagram of the program code 312 shown in FIG. 3 in accordance with one of the exemplary embodiments of the disclosure.

FIG. 4 illustrates a simplified block diagram of the program code 312 shown in FIG. 3 in accordance with one of the exemplary embodiments of the disclosure. In this exemplary embodiment, the program code 312 would include an application layer 400, a Layer 3 portion 402, and a Layer 2 portion 404, and is coupled to a Layer 1 portion 406. The Layer 3 portion 402 would generally perform radio resource control. The Layer 2 portion 404 would generally perform link control. The Layer 1 portion 406 would generally perform physical connections.

For LTE or LTE-A system, the Layer 2 portion 404 may include a Radio Link Control (RLC) layer and a Medium Access Control (MAC) layer. The Layer 3 portion 402 may include a Radio Resource Control (RRC) layer.

Figure 5:
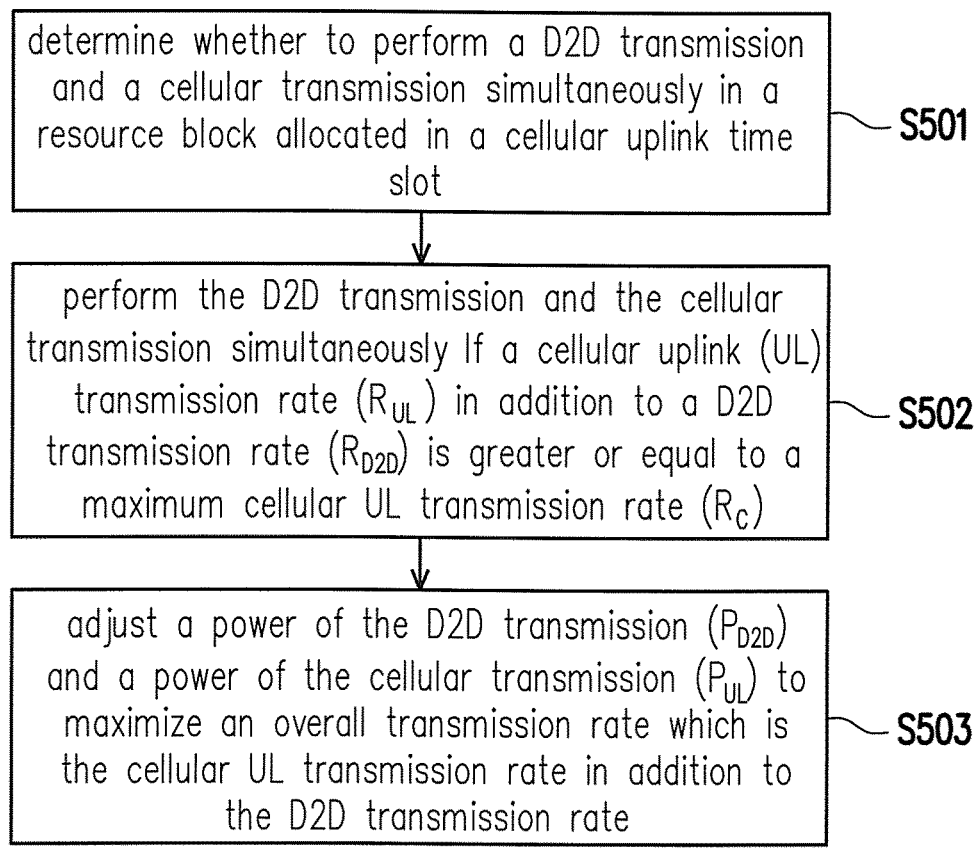
FIG. 5 illustrates a method and apparatus for device-to-device (D2D) communication in a wireless communication system in accordance with one of the exemplary embodiments of the disclosure.

FIG. 5 illustrates a method and apparatus for device to device (D2D) communication in a wireless communication system applicable to a user equipment (UE). In step S501, the UE may determine whether to perform a D2D transmission and a cellular transmission simultaneously in a resource block allocated in a cellular uplink time slot. If a cellular uplink (UL) transmission rate ($R_{UL}$) in addition to a D2D transmission rate ($R_{D2D}$) is greater than or equal to a maximum cellular UL transmission rate ($R_C$), then in step S502, the UE may perform the D2D transmission and the cellular transmission simultaneously. In step S503, the UE may adjust a power of the D2D transmission ($P_{D2D}$) and a power of the cellular transmission ($P_{UL}$) to maximize an overall transmission rate which is the cellular UL transmission rate in addition to the D2D transmission rate.

In one of the exemplary embodiments, $R_C$ is determined according to:

$$R_C = B \log_2\left(1 + \frac{P_{total} G_{UE,BS}}{N}\right),$$

wherein B is a bandwidth of the cellular UL transmission, $P_{total}$ is a maximum transmission power constraint of the UE, $G_{UE,BS}$ is a processing gain of a channel of the cellular transmission, and N is a thermal noise power.

In one of the exemplary embodiments, $R_{UL}$ is determined according to:

$$R_{UL} = B \log_2\left(1 + \frac{P_{UL} G_{UE,BS}}{N + I_{D2D}}\right),$$

wherein $P_{UL}$ is the transmission power of the cellular transmission and $I_{D2D}$ is an interference signal received by a base station.

In one of the exemplary embodiments, $R_{D2D}$ is determined according to $$R_{D2D} = B \log_2\left(1 + \frac{P_{D2D} G_{D_{TX},D_{RX}}}{N + I_C}\right),$$

wherein $P_{D2D}$ is the transmission power of the D2D transmission, $I_C$ is an interference signal received by a second UE, and $G_{D_{TX},D_{RX}}$ is a processing gain of a channel of the D2D transmission.

In one of the exemplary embodiments, the power of the D2D transmission ($P_{D2D}$) is determined according to:

$$P_{D2D} = \frac{(P_{total} G_{UE,BS} + N)^{1-p} N^p - N}{G_{UE,BS}}$$

and the power of the cellular transmission ($P_{UL}$) is determined according to: $P_{UL} = P_{total} - P_{D2D}$.

In one of the exemplary embodiments, the UE may further perform: measuring a cellular channel information of the cellular transmission; measuring a D2D channel information of the D2D transmission; performing dirty paper coding based on the cellular channel information and the D2D channel information for the cellular transmission and the D2D transmission respectively so as to remove cellular interference at a receiving D2D UE.

Figure 6:
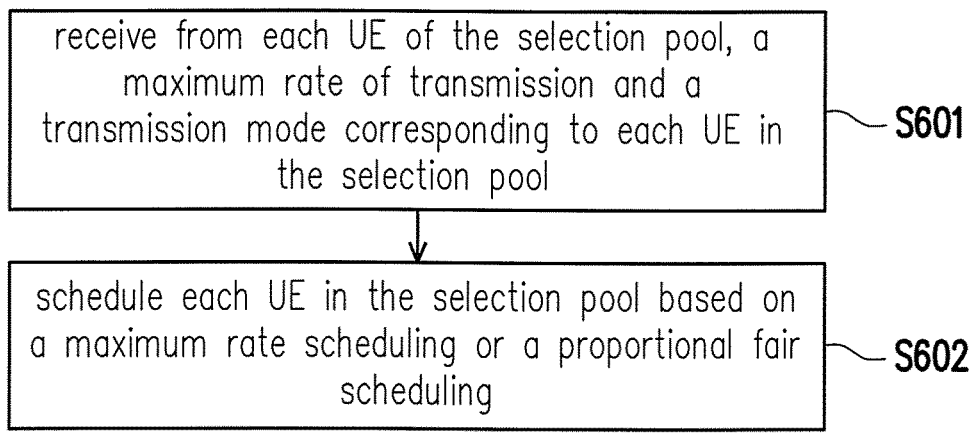
FIG. 6 illustrates a method and apparatus for device-to-device (D2D) communication in a wireless communication system in accordance with one of the exemplary embodiments of the disclosure.

FIG. 6 illustrates a method and apparatus for device to device (D2D) communication in a wireless communication system applicable to a base station (BS) for scheduling UEs in a selection pool. In step S601, the BS would receive from each UE of the selection pool, a maximum rate of transmission and a transmission mode corresponding to each UE in the selection pool. In step S602, the BS would schedule each UE in the selection pool based on a maximum rate scheduling or a proportional fair scheduling. wherein scheduling each UE would include determining whether a first UE is scheduled with a cellular uplink (UL) transmission and a D2D transmission simultaneously; determining whether the D2D transmission of the first UE is with a second UE and whether the D2D transmission is in the same time interval as the cellular UL transmission; if the first UE is scheduled with a cellular uplink (UL) transmission and a D2D transmission simultaneously and the D2D transmission of the first UE is with the second UE, then the BS would adjust a schedule of the second UE so that the second UE does not perform UL transmission in a same time interval as receiving the D2D transmission from the first UE.

In one of the exemplary embodiments, the scheduling each UE in the selection pool based on the maximum rate scheduling may include selecting a UE i* with $$i^* = \arg\max_i R_i;$$

retrieving a maximum rate of transmission and a transmission mode from a UE i*; removing the UE i* from the selection pool; if the UE i* is scheduled for cellular UL transmission only, and also if a UE k in the selection pool requires a D2D transmission to be transmitted to the UE i*, then a transmission mode of UE k and a maximum transmission rate of UE k are modified as cellular uplink (UL) transmission only; and repeating the steps until the selection pool is empty.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Because of high computational complexity and high amount of overhead in obtaining the data associated with communication channels between D2D communication devices and between devices using cellular communications, inband underlay D2D has rarely been implemented in practical systems until recently. As an example, inband overlay D2D communication is currently being evaluated for a LTE/LTE-A system. However, inband overlay D2D would normally result in lower spectral efficiency because of using separate RBs for D2D communications and cellular communications which does not take advantage of spatial reuse of spectrum. If it is possible to operate underlay D2D communication without incurring high computational complexity and system overhead, then both the disadvantages of existing underlay and overlay D2D schemes could be avoided.

In this disclosure, resource sharing between cellular communication and D2D communication is proposed. A cellular user equipment (UE) can also perform D2D communication if a first UE discovers that a second UE is nearby and wants to communicate with the second UE. It is assumed that the BS scheduler knows the communication needs of the UEs based on their communication requests. For UEs which have discovered each other as being close in their locations during a D2D discovery process, the BS can schedule D2D communication for them if they have the needs to communicate with each other.

Figure 7:
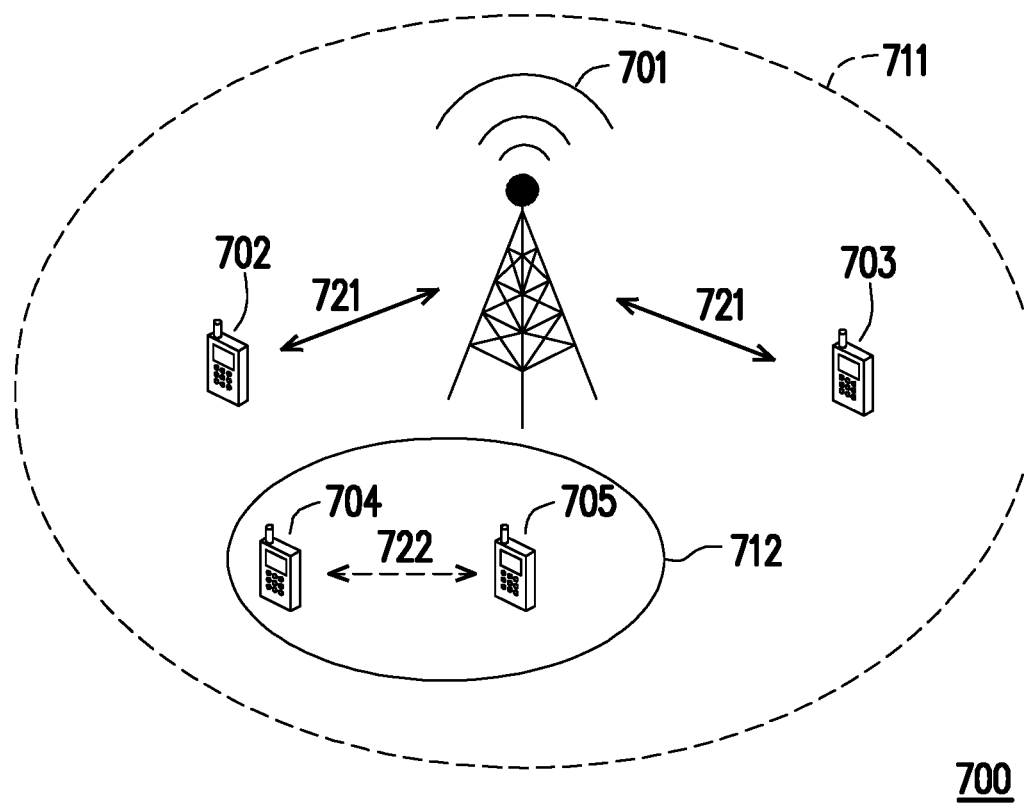
FIG. 7 illustrates an exemplary network in which a cellular network coexists with a D2D network which may operate under an underlay or an overlay mode of operation.

FIG. 7~FIG. 10 and their corresponding written descriptions disclose an exemplary embodiment of D2D communication in a wireless communication system by implementing a simultaneous transmission mode involving an underlay mode of operation by the same UE. For the purpose of elucidating the concept of a proposed exemplary embodiment, FIG. 7 illustrates an exemplary network 700 which network includes not limited to a cellular network 711 coexisting with D2D network 712. For the illustration purpose, the network 700 includes not limited to a base station 701 (e.g., eNB) and a plurality of UEs 702~705. Within the cellular network, the UEs 702 703 may establish cellular links 721 with the base station 701; and also within the D2D network, UEs 704 705 may establish D2D links with each other.

In the exemplary network 700, the D2D UEs 704 705 and cellular UEs 702 703 may reuse the same radio RBs according to an underlay mode of operation. The D2D link 722 may utilize the UL spectrum of the cellular network 711, and D2D UEs 704 705 may switch between transmitting and receiving modes in the cellular UL band in a time division duplexing (TDD) fashion. D2D UEs 704 705 would operate in the cellular UL spectrum in the case of frequency division duplexing (FDD) cellular operation or the cellular UL sub-frames in the case of TDD cellular operation. Also the D2D network 712 may utilize the overlay D2D mode of operation in which communications of the cellular links 721 and D2D links 722 are allocated with separate and dedicated RBs.

Figure 8:
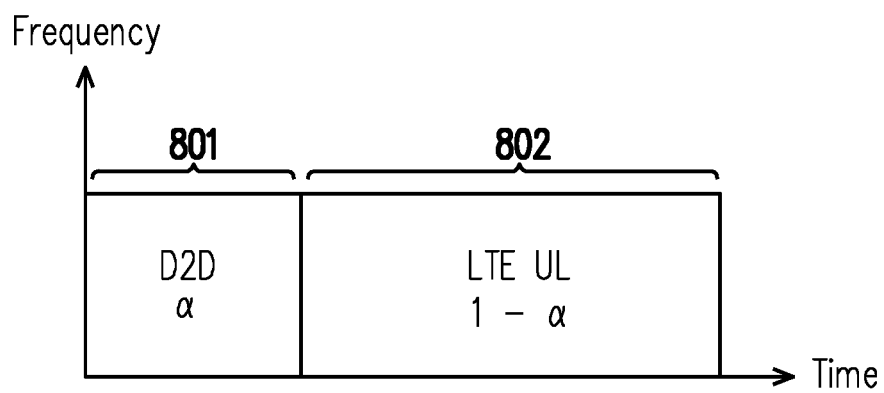
FIG. 8 illustrates orthogonal resource sharing between D2D communication and cellular UL communication in different time slots in accordance with one of the exemplary embodiments of the disclosure.

FIG. 8 illustrates orthogonal resource sharing between D2D communication and cellular UL communication in different time slots in accordance with one of the exemplary embodiments of the disclosure. For flexibility in system design, it is assumed that a first portion 801, α, where α is an adjustable system parameter between 0 and 1, of the time is allocated to D2D communication, while a second portion 802 which is the remaining 1−α of the time is reserved for the cellular UL operation. The BS uses the control channels to inform cellular and D2D UEs about the scheduling decision.

This exemplary embodiment pertains to a system in which during the cellular UL time, D2D communication and cellular communicate may transpire simultaneously. In the case of simultaneous cellular UL and D2D transmissions, a dirty paper coding (DPC) or a similar technique could be applied at a D2D transmitter to minimize an interference from the cellular UL signal at a D2D receiver. DPC only removes the interference seen by the D2D receiver but not the interference from the D2D signal to the BS. Thus there could be a performance degradation of the cellular UL signal. However, since the transmission power for a D2D communication link (e.g., 722) could be assumed to be negligible in comparison to the transmission power of a cellular UL communication link (e.g., 721), the degradation of the cellular UL communication (e.g., 721) could minimal. However, in some cases, it may still be desirable to optimize a system such that the degradation of the cellular UL is taken into consideration.

Figure 9:
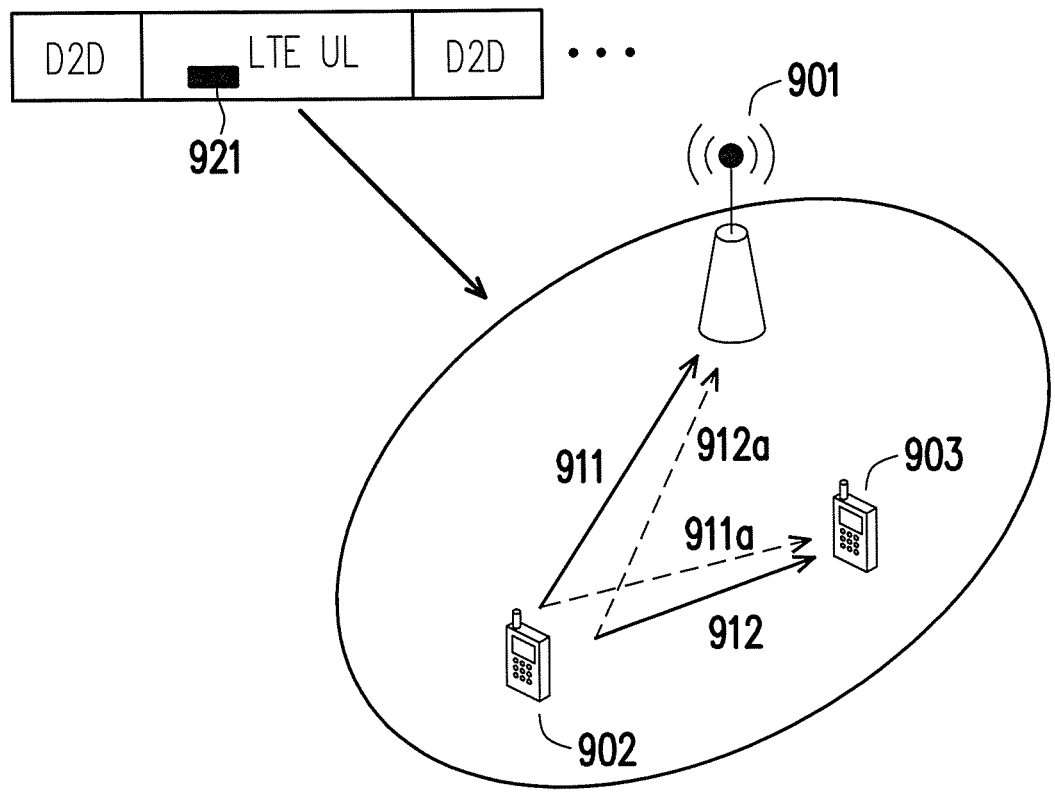
FIG. 9 illustrates an interference between cellular UL transmission and D2D transmission which could be managed by dirty paper coding (DPC) based precoding techniques at the transmitting UE in accordance with one of the exemplary embodiments of the disclosure.

FIG. 9 illustrates an interference between cellular UL transmission and D2D transmission which could be managed by dirty paper coding (DPC) based precoding techniques at the transmitting UE in accordance with one of the exemplary embodiments of the disclosure. The exemplary scenario of FIG. 9 involves a base station 901 establishing a UE to BS cellular link 911 with a first UE 902 which establishes a D2D link 912 with a second UE 903. The cellular link 911 could be an interference signal 911a at the receiver of the second UE 903 while the D2D link 912 could be an interference signal 912a at the receiver of the BS 901. For simultaneous cellular UL 911 and D2D 912 transmissions, while in the cellular UL time slot, a D2D receiving UE (e.g., 902) switches to the receiving mode and cannot be scheduled for cellular UL transmission. If the first UE 902 and the second UE 903 are scheduled for cellular UL communication at the same time, the D2D communication will fail since the second UE 903 is not in the receiving mode. Due to this issue, the cellular UL scheduling will be affected and need to be re-designed.

The concept of the embodiment of the disclosure is that a UE may use the same radio resource to perform cellular UL transmission (e.g., 911) and D2D communication (e.g., 912) in the same transmission time interval. More specifically, a UE (e.g., 902) may perform precoding on the transmitted cellular UL and D2D signals to properly manage resource sharing and interference between them. The precoding could be accomplished according to dirty paper coding (DPC). More details would be provided as follows.

Given that a cellular UL communication is generally allocated with much more resources than a D2D communication, if a UE in cellular UL transmission can simultaneously (i.e., in the same RB) do D2D transmission, the D2D data rate would be significantly improved. As shown in FIG. 9, since the cellular UL communication 911 and the D2D communication 912 would share the same RB 921, thus the exemplary embodiment of FIG. 9 would be a type of underlay D2D which has higher spectral efficiency than overlay D2D.

For simultaneous cellular UL 911 and D2D 912 transmissions, since there are two independent data signals emitted from the same UE 902 destined to two different receivers, the receiver of the BS 901 and the D2D receiver of UE 903, there will be interference at both receivers. Since D2D communication takes advantage of the physical proximity of communication devices, the transmission power for D2D is usually far less than the transmission power for cellular UL. Thus the interference caused by the cellular UL signal 911a at the D2D receiver of the second UE 903 is more of a problem compared to the interference from the D2D signal 912a seen at the BS 901. This problem at the D2D receiver 903 could be avoided by precoding at the transmitting UE. It is assumed that, through control signaling, the D2D channel condition is known at the UE 902 performing simultaneous cellular UL and D2D transmissions. If the interference (i.e., the cellular UL signal 911a) as the channel side information could be known at the transmitting UE 902, then the theory of DPC could be applied to precode the transmitted signals at the transmitting UE to completely or substantially remove the interference at the D2D receiver of the second UE 903. Currently, practical implementations of DPC have been known as thus a detailed analysis would not be deemed necessary.

Figure 10:
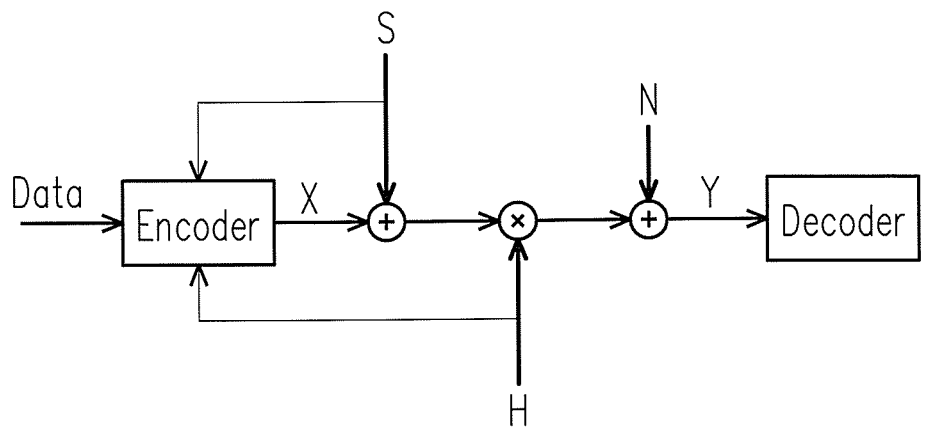
FIG. 10 illustrates Dirty-paper channel with channel state information at a D2D transmitter in accordance with one of the exemplary embodiments of the disclosure.

FIG. 10 illustrates dirty paper channel with channel state information at a D2D transmitter in accordance with one of the exemplary embodiments of the disclosure. With the DPC proper process at the transmitter (e.g., 902), the communication quality of this channel could be as good as that of the channel without interference. It also has been shown that DPC is the optimal capacity achieving strategy in the broadcast channel where independent signals are transmitted by the same transmitter. Further, a lattice based DPC scheme could be used where a fine tessellated lattice constitutes the transmitted signal constellation, while a coarse lattice is used to quantize the transmitted signal (at the transmitter 902) and the received signal (at the receiver 903) such that the eventual transmitted signal and the quantized received signal (for further signal detection) belong to the fundamental Voronoi region (i.e., the Voronoi region closest to the origin). Through the quantization with respect to the coarse lattice, the effect of the interference is limited within the fundamental Voronoi region, and can be completely removed with additional transmitter and receiver processing. Also, schemes based on superposition of two channel codes could also be implemented, with one playing a role similar to that of the fine lattice and the other playing a role similar to that of the coarse lattice. However, the nested lattice requirement in the lattice based scheme could relaxed. Thus the superposition code based scheme is easier and more flexible to design and implement.

In the case of simultaneous cellular UL and D2D transmissions, the DPC techniques can be applied at the transmitter 902 to remove the strong interference from the cellular UL signal 911a to the D2D receiver 903. The transmitting UE 902 only needs to have the knowledge of its own D2D channel in order to perform a DPC. This requirement is much easier to achieve compared to the general underlay D2D scenario where all the channels of the D2D pairs (e.g., 902 903) need to be known at the BS 901 to perform interference management.

The above exemplary embodiment could be easily extended to the scenario where the transmitting UE 902 and/or the receiving BS 901 and/or UE 903 are equipped with multiple antennas. In that scenario, the design concept remains the same. Only the DPC scheme needs to be replaced with a multi-antenna based design.

Figure 11:
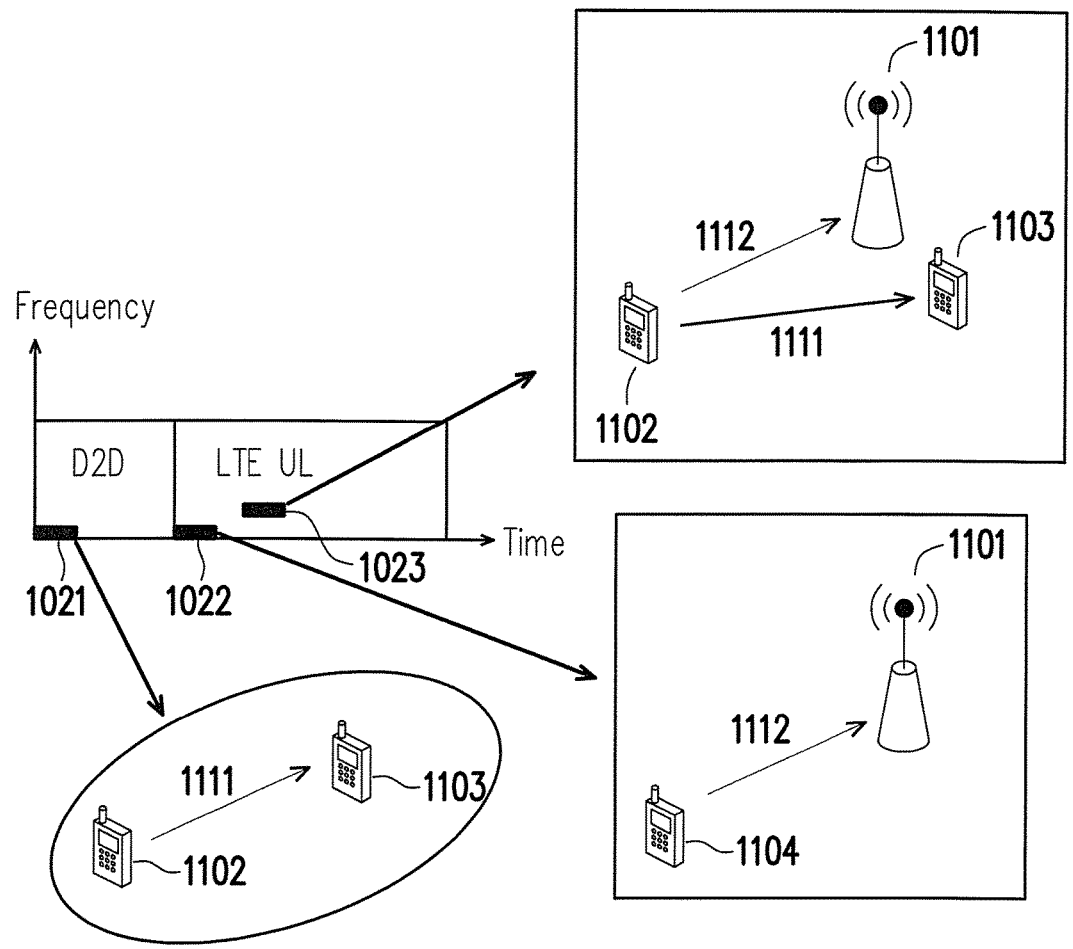
FIG. 11 illustrates network operating under a D2D mode, a cellular UL only mode, and simultaneous cellular UL and D2D transmission mode in accordance with one of the exemplary embodiments of the disclosure.
Figure 12:
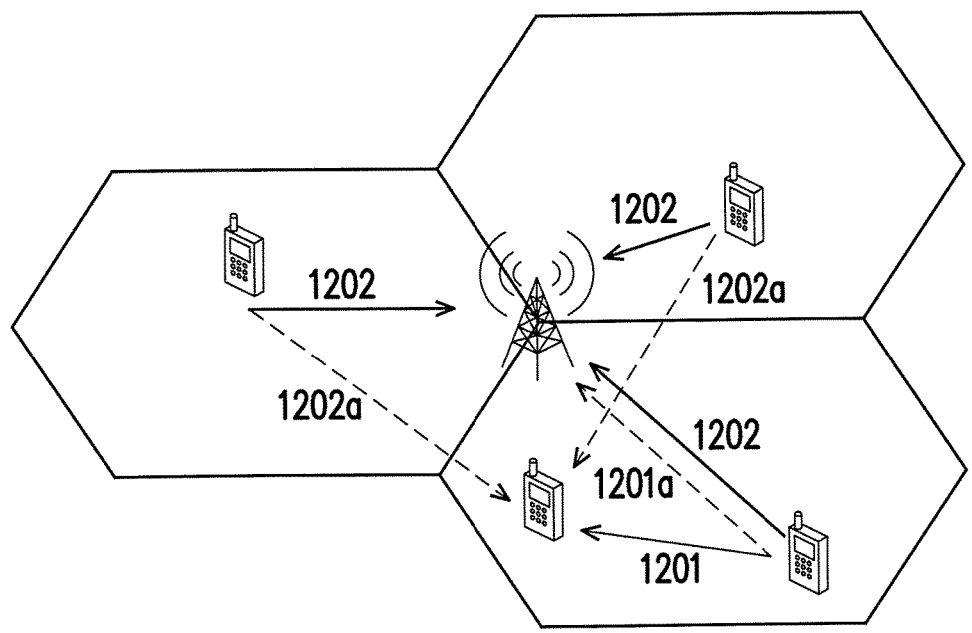
FIG. 12 illustrates an interference scenario involving multiple UEs in accordance with one of the exemplary embodiments of the disclosure.

FIG. 11~FIG. 12 and their corresponding written descriptions disclose an exemplary embodiment of D2D communication in a wireless communication system by optimizing transmission mode selection and power allocation. In the scenario of FIG. 11, assuming that a TDD scheme similar to FIG. 8 is utilized, a first RB 1021 could be allocated for a D2D communication link 1111 between a first UE 1102 and a second UE 1103. A second RB 1022 could be allocated for a UL cellular link 1112 between a BS 1101 and a first UE 1102. A third RB 1023 in the UL cellular spectrum could be allocated simultaneous D2D communication 1111 and cellular 1112 communication. The concept of exemplary embodiment is that data rate would be taken into account to determine whether to perform cellular UL only transmission 1112 or simultaneous cellular UL and D2D transmissions (i.e. both 1111 and 1112). More specifically, the determination would optimize the overall data rate, or a function of the data rate if other performance metrics (such as fairness, etc.) could be adopted. Still, more specifically, simultaneous cellular UL and D2D transmissions could be preferred if the sum rate of cellular UL and D2D transmissions, or a function of the cellular UL and D2D rates, is better than the achievable data rate, or a function of it, of the cellular UL only transmission (e.g., 1112).

In one embodiment, there could be a lower limit imposed for the data rate of cellular UL transmission, or a function of it, e.g., guaranteed data rate, or other performance metrics, of cellular UL transmission. Furthermore, the lower limit for the data rate of cellular UL transmission, or a function of it, is set based on the ongoing service.

To be more specific to any of the above embodiments, if simultaneous cellular UL and D2D transmissions is performed, a power allocation between cellular UL and D2D transmissions is performed based on the overall data rate, or a function of the rates. Furthermore, the power allocation would optimize the overall data rate or other performance metrics. The following provides an example that defines the criteria to determine whether it is advantageous for a scheduled cellular UL UE to perform simultaneous D2D transmission.

In this exemplary embodiment, the proposed mode selection between cellular UL only mode and simultaneous cellular UL and D2D transmission mode, as shown in FIG. 11, and power allocation are performed to maximize the total communication rate of cellular UL and D2D. In practice, there is a maximum transmission power constraint $P_{total}$ for the transmitting UE. For example, assuming that the maximum power of the D2D communication link 1111, $P_{D2D}$, and the cellular communication link 1112, PUL is 10 dBm, $P_{total}=P_{D2D}+P_{UL}=10$ dBm.

In the cellular UL only mode, the channel capacity (the maximum communication rate) is $$R_C = B\log_2\left(1 + \frac{P_{total}G_{UE,BS}}{N}\right) \quad (1)$$

where B is the bandwidth available for the cellular UL transmission, $G_{UE,BS}$ is the processing gain from the UE to the BS, N is the thermal noise power. In the simultaneous transmission mode, let $R_{UL}$ and $R_{D2D}$ be the cellular UL rate and D2D rate, respectively.

Assuming that dirty paper coding (DPC) based precoding is to be applied at the transmitting UE to remove the interference from the cellular UL signal to the D2D receiver, the sum rate transmitted by the UE is $$R_{total} = R_{UL} + R_{D2D} \quad (2)$$
$$R_{UL} = B\log_2\left(1 + \frac{P_{UL}G_{UE,BS}}{N+I_{D2D}}\right)$$
$$R_{D2D} = B\log_2\left(1 + \frac{P_{D2D}G_{D_{TX},D_{RX}}}{N+I_C}\right)$$

where $P_{D2D}$ is the transmission power for D2D, $P_{UL}$ is the transmission power for cellular UL, $G_{D_{Tx},D_{Rx}}$ is the processing gain for the D2D channel, and $I_{D2D}$ is the interference at the BS, including interference from D2D as well as from the UL transmissions in other sectors/cells, $I_C$ is the interference at the D2D receiver due to other D2D transmissions as well as cellular UL transmissions in other sectors/cells.

FIG. 12 illustrates an interference scenario involving a base station communicating with multiple UEs. In the scenario of FIG. 12, UEs may transmit D2D signals 1201 from which an interference signal 1201a could be received at a base station, however negligible. Also, UEs may transmit a cellular signal 1202 from which interference 1202a may cause interference for other UEs. By using a DPC technique, the interference from the UL signal to D2D receiver can be removed, but the D2D receiver is still interfered by UEs in other sectors/cells. When the UL channel condition is poor, a scheduled UL UE can perform simultaneous D2D transmission to achieve higher transmission rate for the D2D based proximity services. However, when a D2D receiver is very close, maximizing the sum rate would mean using most of the available transmission power for D2D communication. It will severely reduce the cellular UL rate which may still need to support the non-proximity services such as data destined to other cells. Thus it could be important to set a lower limit on the obtained cellular UL rate while performing power allocation between cellular UL and D2D transmissions. The minimum UL rate constraint is set to be p times the UL rate when all power is used for cellular UL transmission, where p is a number between 0 and 1 that can be adjusted according to the types of services the UE is receiving.

With the total power constraint and minimum UL rate constraint set, whether simultaneous transmission mode is preferred is determined by whether more sum rate can be achieved, i.e., whether $R_{UL}+R_{D2D} \geq R_C$. The mode selection criterion will later on be simplified in order for comparing the achievable rate of the UL only mode (1) and that of the simultaneous transmission mode (9). If the rate in (9) would be higher, than simultaneous transmission could be preferred.

The power allocation problem for the simultaneous transmission mode could be formulate as (3). If constraint (3.3) would not met, then no simultaneous transmission would be performed as the total power would be used for the cellular UL communication. Otherwise the power would be allocated between the cellular UL transmission and the D2D transmission. Note that mode selection could be performed by the UE alone and does not require network assistance.

$$\underset{P_{UL},P_{D2D}}{\text{maximize}} \log_2\left(1 + \frac{P_{UL}G_{UE,BS}}{N + I_{D2D}}\right) + \log_2\left(1 + \frac{P_{D2D}G_{D_{TX},D_{RX}}}{N + I_C}\right) \quad (3)$$

subject to $P_{UL} + P_{D2D} \leq P_{total}$ (3.1)

$$\log_2\left(1 + \frac{P_{UL}G_{UE,BS}}{N + I_{D2D}}\right) \geq p \log_2\left(1 + \frac{P_{total}G_{UE,BS}}{N}\right) \quad (3.2)$$

$$\log_2\left(1 + \frac{P_{UL}G_{UE,BS}}{N + I_{D2D}}\right) + \log_2\left(1 + \frac{P_{D2D}G_{D_{TX},D_{RX}}}{N + I_C}\right) \geq \quad (3.3)$$
$$\log_2\left(1 + \frac{P_{total}G_{UE,BS}}{N}\right)$$

It could be shown that in both UL only and simultaneous transmission modes, the maximum sum rate is a monotonic function of the total transmission power. Thus, constraint (3.1) would be met with equality when the maximum sum rate is achieved. By considering only the interference from the simultaneous D2D signal to the cellular UL (and absorbing the interference from other D2D, and the UL transmissions from other sectors/cells into the noise term N), constraint (3.2) could be simplified as $$\log_2\left(1 + \frac{P_{UL}G_{UE,BS}}{N + P_{D2D}G_{UE,BS}}\right) \geq p \log_2\left(1 + \frac{P_{total}G_{UE,BS}}{N}\right) \Leftrightarrow \quad (4)$$
$$\left(1 + \frac{P_{UL}G_{UE,BS}}{N + P_{D2D}G_{UE,BS}}\right) \geq \left(1 + \frac{P_{total}G_{UE,BS}}{N}\right)^p \Leftrightarrow$$
$$\left(\frac{N + P_{total}G_{UE,BS}}{N + P_{D2D}G_{UE,BS}}\right) \geq \left(\frac{N + P_{total}G_{UE,BS}}{N}\right)^p \Leftrightarrow$$
$$(N + P_{total}G_{UE,BS})^{1-p}N^p \geq N + P_{D2D}G_{UE,BS}$$

Similarly, constraint (3.3) could be simplified as $$\log_2\left(1 + \frac{P_{UL}G_{UE,BS}}{N + I_{D2D}}\right) + \log_2\left(1 + \frac{P_{D2D}G_{D_{TX},D_{RX}}}{N + I_C}\right) \geq \quad (5)$$
$$\log_2\left(1 + \frac{P_{total}G_{UE,BS}}{N}\right) \Leftrightarrow$$
$$\log_2\left(\frac{N + P_{total}G_{UE,BS}}{N + P_{D2D}G_{UE,BS}} \times \frac{N + I_C + P_{D2D}G_{D_{TX},D_{RX}}}{N + I_C}\right) \geq$$
$$\log_2\left(\frac{N + P_{total}G_{UE,BS}}{N}\right) \Leftrightarrow$$
$$N(N + I_C + P_{D2D}G_{D_{TX},D_{RX}}) \geq (N + I_C)(N + P_{D2D}G_{UE,BS}) \Leftrightarrow$$
$$N(G_{D_{TX},D_{RX}} - G_{UE,BS}) \geq G_{UE,BS} \times I_C$$

Since the power allocation for the UL transmission only mode is trivial, power allocation of the simultaneous transmission mode would be focus upon to rewrite problem (3) as:

$$\underset{P_{UE},P_{D2D}}{\text{maximize}} \log_2\left(1 + \frac{P_{UL}G_{UE,BS}}{N + I_{D2D}}\right) + \log_2\left(1 + \frac{P_{D2D}G_{D_{TX},D_{RX}}}{N + I_C}\right) \quad (6)$$

subject to $P_{UL} + P_{D2D} = P_{total}$ (6.1)

$$P_{D2D} \leq \frac{(P_{total}G_{UE,BS} + N)^{1-p}N^p - N}{G_{UE,BS}} \quad (6.2)$$

$$N(G_{D_{TX},D_{RX}} - G_{UE,BS}) \geq G_{UE,BS} \times I_C \quad (6.3)$$

which could be further simplified as $$\underset{P_{UE},P_{D2D}}{\text{maximize}} P_{D2D} \quad (7)$$

subject to $P_{UL} + P_{D2D} = P_{total}$ $$P_{D2D} \leq \frac{(P_{total}G_{UE,BS} + N)^{1-p}N^p - N}{G_{UE,BS}}$$

$$N(G_{D_{TX},D_{RX}} - G_{UE,BS}) \geq G_{UE,BS} \times I_C$$

because $$\underset{P_{UL},P_{D2D}}{\text{maximize}} \log_2\left(1 + \frac{P_{UL}G_{UE,BS}}{N + I_{D2D}}\right) + \log_2\left(1 + \frac{P_{D2D}G_{D_{TX},D_{RX}}}{N + I_C}\right) \Leftrightarrow \quad (8.1)$$

$$\underset{P_{UL},P_{D2D}}{\text{maximize}} \frac{N + P_{D2D}G_{UE,BS} + P_{UL}G_{UE,BS}}{N + P_{D2D}G_{UE,BS}} \times \quad (8.2)$$
$$\frac{N + I_C + P_{D2D}G_{D_{TX},D_{RX}}}{N + I_C} \Leftrightarrow$$

$$\underset{P_{D2D}}{\text{maximize}} \frac{N + P_{total}G_{UE,BS}}{N + P_{D2D}G_{UE,BS}} \times \frac{N + I_C + P_{D2D}G_{D_{TX},D_{RX}}}{N + I_C} \Leftrightarrow \quad (8.3)$$

$$\underset{P_{D2D}}{\text{maximize}} \frac{N + I_C + P_{D2D}G_{D_{TX},D_{RX}}}{N + P_{D2D}G_{UE,BS}} \Leftrightarrow \quad (8.4)$$

$$\underset{P_{D2D}}{\text{maximize}} \frac{N\left(\frac{G_{UE,BS} - G_{D_{TX},D_{RX}}}{G_{UE,BS}}\right) + I_C}{N + P_{D2D}G_{UE,BS}} + \frac{G_{D_{TX},D_{RX}}}{G_{UE,BS}} \Leftrightarrow \quad (8.5)$$

$$\underset{P_{D2D}}{\text{maximize}} P_{D2D} \quad (8.6)$$

where (8.6) is a result of the fact that in (8.5), $$N\left(\frac{G_{UE,BS} - G_{D_{TX},D_{RX}}}{G_{UE,BS}}\right) + I_C \leq 0$$

since the condition for the simultaneous transmission mode (6.3) has to be satisfied. Solving (7), the optimal power allocation for the simultaneous transmission mode would be $$P^*_{D2D} = \frac{(P_{total}G_{UE,BS} + N)^{1-p}N^p - N}{G_{UE,BS}} \quad (9)$$

$$P^*_{UL} = P_{total} - P^*_{D2D}$$

$$R^*_{total} = \log_2\left(1 + \frac{P^*_{UL}G_{UE,BS}}{N + P^*_{D2D}G_{UE,BS}}\right) + \log_2\left(1 + \frac{P^*_{D2D}G_{D_{TX},D_{RX}}}{N + I_C}\right)$$

Overall, the transmission mode selection could be accomplished by comparing the achievable rate of the UL only mode (1) and that of the simultaneous transmission mode (9). If the rate in (9) is higher, then simultaneous transmission would be preferred. Once the transmission mode is selected, for the UL only mode, all power will be used for the cellular UL transmission. For the simultaneous transmission mode, power allocation in (9) would be used.

In an alternative embodiment, other performance metrics instead of the rate function in (1) and (2) could be adopted.

The related objective function (3) and constraints (3.2), (3.3) could be modified accordingly. For example, the rate function R in (1) and (2) could be replaced by a generalized proportional fair function [13]

$$\frac{R^a}{\overline{R}^b}$$

where R is the instantaneously achievable rate function as in (1) and (2), $\overline{R}$ is the historical average rate up to the current time, and a and b are parameters that could be adjusted to tune the fairness of the achieved rates. For example, if a=1 and b=0, we have the maximum rate scheme as in the above embodiment. If a=1 and b=1, the objective function (3) will ensure proportional fairness between the UL and D2D transmission rates from the same UE.

Figure 13:
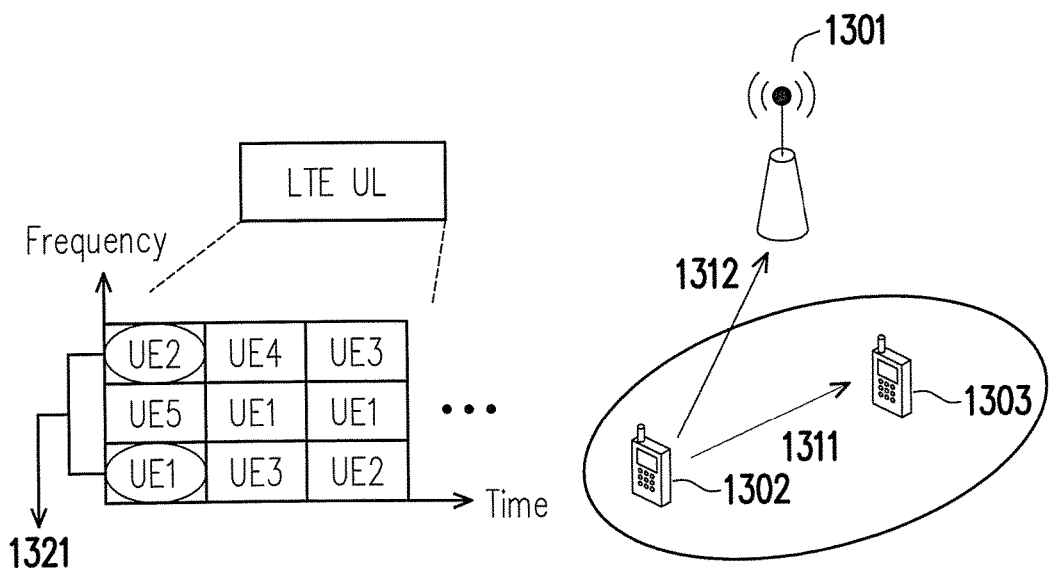
FIG. 13 illustrates a scenario in which the D2D communication would fail if the receiving UE is scheduled for cellular UL transmission at the same time as the D2D transmitting UE.

In accordance with one of the exemplary embodiment of the method of D2D communication in a wireless communication system, the disclosure provides a method of scheduling. FIG. 13 illustrates a scenario in which the D2D communication would fail if the receiving UE is scheduled for cellular UL transmission at the same time as the D2D transmitting UE. In the scenario of FIG. 13, a BS 1301 communicates with a first UE 1302 through a cellular communication link 1312, and the first UE 1302 communicates with a second UE 1303 through a D2D link 1311. Assuming that the D2D link 1311 is transmitted over the LTE UL cellular spectrum, the D2D transmission would fail 1321 if the second UE 1303 is scheduled for cellular UL transmission at the same time as the first UE. In order to resolve the aforementioned problem, a method of scheduling is provided.

According to the exemplary embodiment of FIG. 13, when the first UE 1302 is scheduled with simultaneous cellular UL and D2D transmissions, the second UE 1303 which would be receiving the D2D transmission from the first UE 1302 is not scheduled with cellular UL transmission in the same transmission time interval. An example of a scheduling algorithm could be based on maximum rate scheduling. Alternatively, another scheduling algorithm could be based on proportional fair (PF) scheduling.

In the scenario of FIG. 13, the first UE 1302 may report the maximum achievable rate and the transmission mode that achieves the maximum rate to the BS 1301. More specifically, the first UE 1301 may take the achievable rate of cellular UL only transmission and the achievable data rate of simultaneous cellular UL and D2D transmission into account when reporting the maximum data rate. Still, more specifically, the maximum achievable rate is the larger one between the achievable rate of cellular UL only transmission and the achievable data rate of simultaneous cellular UL and D2D transmission.

In another exemplary embodiment, the BS 1301 may schedule either the first UE 1302 or the second UE with cellular UL transmission in the same transmission time interval if the first UE 1302 and the second UE 1303 are conducting D2D communication with each other in the same transmission time interval as the scheduled UL transmission. An example of the scheduling algorithm could be based on the maximum rate scheduling. Furthermore, the BS 1301 may take the maximum achievable rate reported by the UEs (e.g., 1302 1303) into account when performing scheduling. More specifically, the maximum achievable rate is the larger one between the achievable rate of cellular UL only transmission and the achievable data rate of simultaneous cellular UL and D2D transmission. The BS may schedule 1301 the UEs (e.g., 1302 1303) having the highest maximum achievable rates. Alternatively, the BS 1301 may schedule the UEs (e.g., 1302 1303) based on proportional fair scheduling using the maximum achievable rates reported by the (e.g., 1302 1303).

Thus, in general a UE that needs to receive D2D communication because its D2D transmitting UE has been scheduled, cannot be scheduled for transmission at the same time. This design could be applied and combined with any scheduling algorithms. This design constraint would affect the performance of maximum rate scheduling when the two UEs in D2D communication both have good UL channel conditions while the other UEs do not. However, the probability for this problem to happen would decrease as the number of UEs becomes large. For PF scheduling, the impact of this constraint would almost be unnoticeable.

With the mode selection being as previously proposed, the scheduling algorithm could be modified to improve the system performance. An example of the modified scheduling algorithm is given as follows.

For maximum rate scheduling, the BS may schedule based on the maximum achievable rates of UEs using the mode selection and power allocation algorithm performed and reported to the BS by individual UEs. The BS would then schedule the UEs with the highest maximum rates considering both the UL only mode and the simultaneous transmission mode. The enhanced maximum rate scheduling is formulated as follows, where for UEs with both UL and D2D communication demands, the optimal power allocation is done as described in (9).

Step 1 (as performed by each UE): For all UEs in the UL scheduling pool, i.e., having UL traffic, compute the maximum rate and transmission mode to report to the BS.

$$\begin{cases} R_i = \max\left[\log_2\left(1 + \frac{P_{UL}G_{UE,BS}}{N + P_{D2D}G_{UE,BS}}\right) + \log_2\left(1 + \frac{P_{D2D}G_{D_{Tx},D_{Rx}}}{N + I_C}\right), \log_2\left(1 + \frac{P_{total}G_{UE,BS}}{N}\right)\right] & \text{for UEs with both UL and D2D demands} \\ R_i = \log_2\left(1 + \frac{P_{total}G_{UE,BS}}{N}\right) & \text{for UEs with only UL demand} \end{cases}$$

Step 2 (scheduling performed at the BS):
For each selection round, select UE i* with $$i^* = \arg\max_i R_i.$$

Step 3: Remove UE i* from the selection pool.
Step 4: If UE i* is scheduled for simultaneous cellular UL and D2D transmissions, remove its D2D receiver j from the selection pool. If UE i* is scheduled for cellular UL transmission only, and if another UE k in the selection pool reported to the BS to have D2D traffic to be transmitted to UE i*, then UE k's reported transmission mode and maximum transmission rate need to be modified to be UL only transmission.

Step 5: While the selection pool is not empty and there are still RBs available, go to Step 2. Otherwise the scheduling process is completed for the current transmission time interval.

In an alternative embodiment, other performance metrics could be utilized instead of what was proposed. In particular, instead of the rate function can be adopted in Step 1, for example, the rate function for the cellular UL and the D2D transmissions in Step 1 could be replaced by a generalized proportional fair function $$\frac{R^a}{\overline{R}^b}$$

where R is the instantaneously achievable rate function, $\overline{R}$ is the historical average rate up to the current time, and a and b are parameters that can be adjusted to tune the fairness of the achieved rates. For example, if a=1 and b=0, the maximum rate scheme could be derived as in the above embodiment. If a=1 and b=1, Step 1 will ensure proportional fairness between the UL and D2D transmission rates from the same UE. The mode selection and optimal metric feedback from a UE to the BS are the same as in previously mentioned. With the performance metric fed back from the UE to the BS changed, the BS scheduling procedure from Step 2 to Step 5 will become optimal in a different sense. For example, if a=1 and b=1, Step 2 to Step 5 will result in proportional fair scheduling.

In view of the aforementioned descriptions, the present disclosure is suitable for being used in a wireless communication system and contain numerous benefits. By allowing simultaneous UL and D2D transmissions from the same UE, the advantage of underlay D2D in spectral efficiency could be obtained while avoiding the computational complexity and system overhead of the conventional underlay D2D. DPC preceding would be used to remove the interference from the cellular UL signal to the D2D communication, thus the D2D performance will not be compromised. On the other hand, because of usually much smaller power of D2D, the D2D signal does not cause much interference to the UL signal. This has been verified by network simulations. The proposed scheme would only require a UE to precode and do power allocation based on the knowledge of its own channels, thus can be performed by the UEs independently. The technique could be directly applied to the UL time slots in overlay D2D. It may also be combined with conventional underlay D2D with other D2D users transmitting in the same RBs as the UE in the simultaneous UL and D2D transmission mode. The gain provided by the proposed scheme would be additive to the existing overlay and underlay D2D communications.

The proposed transmission mode selection and power allocation specific to the simultaneous cellular UL and D2D transmissions optimize and improve the performance of individual UEs which in turn improves the performance of the entire network with proper scheduling algorithm. In comparison to the existing underlay D2D systems which need the channel information of all links at the BS to perform system optimization, the proposed method could be operated by individual UEs based only on the knowledge of their own channels. The complexity of the proposed methods would certainly lower than that of the existing underlay D2D, while very good performance can be achieved.

The proposed method of scheduling with D2D induced constraint would well suits the simultaneous cellular UL and D2D transmissions. It would be simple and could be combined with any existing scheduling algorithms to bring out the potential gain of simultaneous transmission. With proper mode selection, power allocation algorithms and the corresponding mode and maximum achievable rate feedbacks, the scheduler may always select UEs with the highest sum rate to maximize the overall system throughput (of cellular UL and D2D communications).

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of" and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

While the disclosure has been described in connection with various aspects, it will be understood that the disclosure is capable of further modifications. This application is intended to cover any variations, uses or adaptation of the disclosure following, in general, the principles of the invention, and including such departures from the present disclosure as come within the known and customary practice within the art to which the disclosure pertains.

What is claimed is:

1. A method used by a user equipment (UE) for device to device (D2D) communication in a wireless communication system, the method comprising:
   determining whether to perform a D2D transmission and a cellular transmission simultaneously in a resource block allocated in a cellular uplink time slot, wherein determining whether to perform the D2D transmission and the cellular transmission simultaneously in the resource block allocated in the cellular uplink time slot comprises:
   if a cellular uplink (UL) transmission rate ($R_{UL}$) plus a D2D transmission rate ($R_{D2D}$) is greater than or equal to a maximum cellular UL transmission rate ($R_C$):
   performing the D2D transmission and the cellular transmission simultaneously; and
   adjusting a power of the D2D transmission ($P_{D2D}$) and a power of the cellular transmission ($P_{UL}$) to maximize an overall transmission rate which is the cellular UL transmission rate plus the D2D transmission rate; and
   if the cellular UL transmission rate ($R_{UL}$) plus the D2D transmission rate ($R_{D2D}$) is less than the maximum cellular UL transmission rate ($R_C$), performing the D2D transmission and the cellular transmission in different resource blocks.

2. The method of claim 1, wherein the maximum cellular UL transmission rate ($R_C$) is determined according to at least by a bandwidth of the cellular UL transmission (B), a maximum transmission power constraint of the UE ($P_{total}$), a processing gain of a channel of the cellular transmission ($G_{UE,BS}$), and a thermal noise power (N).

3. The method of claim 2, wherein the cellular UL transmission rate ($R_{UL}$) is determined according to at least a transmission power of the cellular transmission ($P_{UL}$), an interference signal received by a base station ($I_{D2D}$), the N, the B, and the $G_{UE,BS}$.

4. The method of claim 3, wherein:
$R_{UL}$ is determined according to:

$$R_{UL} = B \log_2\left(1 + \frac{P_{UL} G_{UE,BS}}{N + I_{D2D}}\right).$$

5. The method of claim 3, wherein the D2D transmission rate ($R_{D2D}$) is determined at least according to a transmission power of the D2D transmission ($P_{D2D}$), an interference signal received by a second UE ($I_C$), a ($G_{D_{TX},D_{RX}}$) a processing gain of a channel of the D2D transmission, the B, and the N.

6. The method of claim 5, wherein $R_{D2D}$ is determined according to:

$$R_{D2D} = B \log_2\left(1 + \frac{P_{D2D} G_{D_{TX},D_{RX}}}{N + I_C}\right),$$

wherein $P_{D2D}$ is the transmission power of the D2D transmission, $I_C$ is an interference signal received by a second UE, and $G_{D_{TX},D_{RX}}$ is a processing gain of a channel of the D2D transmission.

7. The method of claim 5, wherein adjusting the power of the D2D transmission and the power of the cellular transmission to maximize an overall transmission rate comprising:
setting a minimum UL rate of the cellular transmission to be P times the UL rate of the cellular transmission when all power is used for the cellular transmission, where P is between 0 and 1.

8. The method of claim 7, wherein the power of the D2D transmission ($P_{D2D}$) is determined according to at least the $P_{total}$, the $G_{UE,BS}$, the (N), the P, and the N to the $p^{th}$ power.

9. The method of claim 8, wherein the $P_{D2D}$ is determined according to:

$$P_{D2D} = \frac{(P_{total} G_{UE,BS} + N)^{1-P} N^P - N}{G_{UE,BS}}.$$

10. The method of claim 9, wherein the power of the cellular transmission ($P_{UL}$) is determined according to:

$$P_{UL} = P_{total} - P_{D2D}$$

11. The method of claim 1, wherein the $R_C$ is determined according to:

$$R_C = B \log_2\left(1 + \frac{P_{total} G_{UE,BS}}{N}\right).$$

12. The method of claim 1, wherein if the cellular UL transmission rate ($R_{UL}$) to plus the D2D transmission rate ($R_{D2D}$) is less than the maximum cellular UL transmission rate ($R_C$), $P_{total}$ is all used for the cellular transmission.

13. The method of claim 12, wherein the D2D transmission is inband underlay D2D communication.

14. The method of claim 1 further comprising:
measuring a cellular channel information of the cellular transmission;
measuring a D2D channel information of the D2D transmission; and
performing dirty paper coding based on the cellular channel information and the D2D channel information for the cellular transmission and the D2D transmission respectively so as to remove cellular interference at a receiving D2D UE.

15. A method used by a base station (BS) for device to device (D2D) communication in a wireless communication system in which the BS schedules UEs in a selection pool, the method comprising:
receiving, from each UE of the selection pool, a maximum rate of transmission and a transmission mode corresponding to each UE in the selection pool; and
scheduling each UE in the selection pool based on a maximum rate scheduling or a proportional fair scheduling, wherein scheduling each UE comprising:
determining whether a first UE is scheduled with a cellular uplink (UL) transmission and a D2D transmission simultaneously and determining whether the D2D transmission of the first UE is with a second UE and whether the D2D transmission is in the same time interval as the cellular UL transmission, wherein
if the first UE is scheduled with a cellular uplink (UL) transmission and a D2D transmission simultaneously and the D2D transmission of the first UE is with the second UE, then adjusting a schedule of the second UE so that the second UE does not perform cellular UL transmission in a same time interval as receiving the D2D transmission from the first UE.

16. The method of claim 15, wherein scheduling each UE in the selection pool based on the maximum rate scheduling comprising:
selecting a UE i* with $$i^* = \underset{i}{\mathrm{argmax}}\, R_i;$$

retrieving a maximum rate of transmission and a transmission mode from a UE i*;
removing the UE i* from the selection pool;
if the UE i* is scheduled for cellular UL transmission only, and also if a UE k in the selection pool requires a D2D transmission to be transmitted to the UE i*, then a transmission mode of UE k and a maximum transmission rate of are UE k modified as cellular uplink (UL) transmission only; and
repeating the above steps for scheduling each UE in the selection pool based on the maximum rate scheduling, until the selection pool is empty.

17. The method of claim 16, wherein the maximum rate of transmission and the transmission mode are determined according to at least the a power of the D2D transmission ($P_{D2D}$), a power of the cellular transmission ($P_{UL}$), a channel information of the cellular transmission ($G_{UE,BS}$), a transmission bandwidth (B), an interference signal received by a second UE ($I_C$), and a ($G_{D_{TX},D_{RX}}$) channel information of the D2D transmission.

18. The method of claim 17, wherein the maximum rate of transmission and the transmission mode are determined according to:

$$\begin{cases} R_i = \max\left[\log_2\left(1 + \frac{P_{UL}G_{UE,BS}}{N + P_{D2D}G_{UE,BS}}\right) + \log_2\left(1 + \frac{P_{D2D}G_{D_{TX},D_{RX}}}{N + I_C}\right), \log_2\left(1 + \frac{P_{total}G_{UE,BS}}{N}\right)\right] & \text{for } UEs \text{ with both } UL \text{ and } D2D \text{ demands} \\ R_i = \log_2\left(1 + \frac{P_{total}G_{UE,BS}}{N}\right) & \text{for } UEs \text{ with only } UL \text{ demand} \end{cases}$$

19. The method of claim 15, wherein the maximum rate of transmission is a larger one between an achievable rate of a cellular UL only transmission and an achievable rate of a simultaneous cellular UL and D2D transmission, wherein the achievable rate of the cellular UL is a highest possible data rate of a transmission of the cellular UL and the achievable rate of the simultaneous cellular UL and D2D transmission is a highest possible data rate of a transmission which utilizes both the cellular UL and D2D transmission.

20. The method of claim 15, wherein the BS schedules either the first UE or the second UE with the cellular UL transmission within a time interval if the first UE and the second UE are communicating in D2D communication in the same time interval as the cellular UL transmission.

21. A user equipment (UE) comprising:
a transceiver for transmitting and receiving wireless data; and
a processor coupled to the transceiver and is configured at least for:
determining whether to perform a D2D transmission and a cellular transmission simultaneously in a resource block allocated in a cellular uplink time slot, wherein determining whether to perform the D2D transmission and the cellular transmission simultaneously in the resource block allocated in a cellular uplink time slot comprises:
if a cellular uplink (UL) transmission rate ($R_{UL}$) plus a D2D transmission rate ($R_{D2D}$) is greater than or equal to a maximum cellular UL transmission rate ($R_C$):
performing the D2D transmission and the cellular transmission simultaneously; and
adjusting a power of the D2D transmission ($P_{D2D}$) and a power of the cellular transmission ($P_{UL}$) to maximize an overall transmission rate which is the cellular UL transmission rate plus the D2D transmission rate; and
if the cellular UL transmission rate ($R_{UL}$) plus the D2D transmission rate ($R_{D2D}$) is less than the maximum cellular UL transmission rate ($R_C$), performing the D2D transmission and the cellular transmission in different resource blocks.

22. The UE of claim 21, wherein the maximum cellular UL transmission rate ($R_C$) is determined by the processor according to at least by a bandwidth of the cellular UL transmission (B), a maximum transmission power constraint of the UE ($P_{total}$), a processing gain of a channel of the cellular transmission ($G_{UE,BS}$), and a thermal noise power (N).

23. The UE of claim 22, wherein the cellular UL transmission rate ($R_{UL}$) is determined by the processor according to at least a transmission power of the cellular transmission ($P_{UL}$), an interference signal received by a base station ($I_{D2D}$), the N, the B, and the $G_{UE,BS}$.

24. The UE of claim 23, wherein:
$R_{UL}$ is determined by the processor according to:

$$R_{UL} = B\log_2\left(1 + \frac{P_{UL}G_{UE,BS}}{N + I_{D2D}}\right).$$

25. The UE of claim 23, wherein the D2D transmission rate ($R_{D2D}$) is determined by the processor at least according to a transmission power of the D2D transmission ($P_{D2D}$), an interference signal received by a second UE ($I_C$), a ($G_{D_{TX},D_{RX}}$) a processing gain of a channel of the D2D transmission, the B, and the N.

26. The UE of claim 25, wherein $R_{D2D}$ is determined by the processor according to:

$$R_{D2D} = B\log_2\left(1 + \frac{P_{D2D}G_{D_{TX},D_{RX}}}{N + I_C}\right),$$

wherein $P_{D2D}$ is the transmission power of the D2D transmission, $I_C$ is an interference signal received by a second UE, and $G_{D_{TX},D_{RX}}$ is a processing gain of a channel of the D2D transmission.

27. The UE of claim 25, wherein adjusting the power of the D2D transmission and the power of the cellular transmission to maximize an overall transmission rate comprising:
setting by the processor a minimum UL rate of the cellular transmission to be P times the UL rate of the cellular transmission when all power is used for the cellular transmission, where P is between 0 and 1.

28. The UE of claim 27, wherein the power of the D2D transmission ($P_{D2D}$) is determined by the processor according to at least the $P_{total}$, the $G_{UE,BS}$, the (N), the P, and the N to the $p^{th}$ power.

29. The UE of claim 28, wherein the $P_{D2D}$ is determined by the processor according to:

$$P_{D2D} = \frac{(P_{total}G_{UE,BS} + N)^{1-P}N_p - N}{G_{UE,BS}}.$$

30. The UE of claim 29, wherein the power of the cellular transmission ($P_{UL}$) is determined by the processor according to:

$$P_{UL} = P_{total} - P_{D2D}$$

31. The UE of claim 30, wherein the processor is further configured for:
measuring a cellular channel information of the cellular transmission;
measuring a D2D channel information of the D2D transmission; and
performing dirty paper coding based on the cellular channel information and the D2D channel information for the cellular transmission and the D2D transmission respectively so as to remove cellular interference at a receiving D2D UE.

32. The UE of claim 21, wherein the $R_C$ is determined by the processor according to:

$$R_C = B\log_2\left(1 + \frac{P_{total}G_{UE,BS}}{N}\right).$$

33. The UE of claim 21, wherein if the cellular UL transmission rate ($R_{UL}$) plus the D2D transmission rate ($R_{D2D}$) is less than the maximum cellular UL transmission rate ($R_C$), $P_{total}$ is all used for the cellular transmission.

34. The UE of claim 33, wherein the D2D transmission is inband underlay D2D communication.

* * * * *